United States Patent [19]

Bates et al.

[11] Patent Number: 4,485,207

[45] Date of Patent: Nov. 27, 1984

[54] MACROSCOPIC DIVINYLBENZENE HOMOGENEOUS GELS AND PROCESS

[75] Inventors: Frank S. Bates, Cambridge; Robert E. Cohen, Jamaica Plain, both of Mass.

[73] Assignee: Massachusetts Institute of Technology, Cambridge, Mass.

[21] Appl. No.: 533,169

[22] Filed: Sep. 19, 1983

Related U.S. Application Data

[63] Continuation of Ser. No. 325,893, Nov. 30, 1981, abandoned, which is a continuation of Ser. No. 194,520, Oct. 6, 1980, abandoned.

[51] Int. Cl.³ ............................................. C08F 12/36
[52] U.S. Cl. .................................... 524/751; 524/754; 526/336
[58] Field of Search ............... 526/173, 336; 524/751, 524/754

[56] References Cited

U.S. PATENT DOCUMENTS

| | | | |
|---|---|---|---|
| 3,627,708 | 12/1971 | Morse | 526/336 |
| 4,174,430 | 11/1979 | Kido et al. | 526/336 |
| 4,336,361 | 6/1982 | Tsuruta et al. | 526/336 |

*Primary Examiner*—Paul R. Michl
*Attorney, Agent, or Firm*—Arthur A. Smith, Jr.; Paul J. Cook

[57] ABSTRACT

Macroscopic divinylbenzene gels are provided having a high concentration of chemically accessible free vinyl groups. The gels are prepared in a mixture of nonpolar and polar solvents and in the presence of a polymerization initiator under conditions to eliminate syneresis.

6 Claims, No Drawings

MACROSCOPIC DIVINYLBENZENE HOMOGENEOUS GELS AND PROCESS

BACKGROUND OF THE INVENTION

The Government has rights in some aspects of this invention pursuant to Contract No. N0014-77-C-0311 awarded by the Department of Navy.

This is a continuation of application Ser. No. 325,893 filed Nov. 30, 1981, which, in turn, is a continuation of application Ser. No. 194,520, filed Oct. 6, 1980 both now abandoned.

This invention relates to gel compositions comprising divinylbenzene or copolymers.

Presently, divinylbenzene gels are prepared either by anionic or free radical polymerization. As disclosed by Funke, J. Oil Col., Assoc., Vol. 60, p. 438 (1977), divinylbenzene gels having a small concentration of residual vinyl groups can be produced. However, these gels, as is the case with all other present divinylbenzene gels are subject to syneresis, i.e. during the gelation process, the uncontrolled cross-linking produces a network of ever-increasing tightness so that solvent is eventually rejected from the polymer gel. This results in a product which is either a microgel having an average particle size less than about 10 microns or a chalky precipitate with no mechanical integrity. In these processes, the divinylbenzene polymer or copolymer cross-links and precipitates from the solvent. It is believed that precipitation is effected because the solvent cannot stay within the interstices formed by the cross-linked polymer chains. These polymers are opaque and structurally weak and contain, at best, low concentrations of free vinyl groups. Because of the tightness of the polymer chains, these free vinyl groups generally are chemically inaccessible. These structural features have limited the chemical and physical application of such polymers to a "micro regime", e.g. in a chemical application, as multifunctional initiators for star block polymers and in a physical application, as porous beads for size exclusion chromatography.

Prior to the present invention, no polymer or copolymer of divinylbenzene was available which comprises a homogeneous macroscopic gel structure. Furthermore, prior to the present invention no polymer or copolymer of divinylbenzene was available having chemically accessible vinyl groups to any significant extent. It would be desirable to provide such polymeric compositions so that the chemically accessible vinyl groups could be modified in a desirable manner such as to form catalytic sites or to be made available to extract impurities from compositions contacted with such polymeric materials.

SUMMARY OF THE INVENTION

In accordance with this invention, novel polymers and copolymers of divinylbenzene are provided having a network of polymer chains with limited cross-linking to form interstices. The polymer composition is macroscopic and retains a regular shape either in the presence of or in the absence of a solvent for the polymer composition. The polymer compositions contain free vinyl groups which have been demonstrated to be chemically accessible in quantities up to about 30% of theoretical or more. The polymer compositions are useful either in a modified or unmodified state. In the modified state, the polymeric compositions can be used to purify liquids such as common solvents. In the modified state, the polymeric compositions have a wide range of utility such as a catalyst wherein the vinyl sites are modified with a catalytic moiety.

DETAILED DESCRIPTION OF SPECIFIC EMBODIMENTS

The present invention is based upon the discovery that divinylbenzene polymerization or copolymerization can be controlled to form macroscopic products by controlling the composition of the solvent in which the polymerization occurs. In accordance with this invention, the solvent composition comprises a mixture of nonpolar solvent and a polar solvent, e.g. ether, which interacts with the polymerization active site to substantially reduce or prevent syneresis. While applicants do not wish to be bound to a theory as to the mechanism for forming the compositions of this invention, it is believed that the polor ether solvent coordinates with the anionic portion of the polymer-active site to form unassociated monoetherates. It is believed that the mechanism of propagation occurs via a coordinated vinyl-monoetherate complex thereby to favor linear polymerization while minimizing cross-linking. In accordance with this invention, it is also necessary to regulate the weight ratio of the polar solvent to the polymerization initiator. Alternatively, a second class of solvents or solvent mixtures may be found which favor unassociated growing chains without forming the chain-solvent complex.

Representative, for the first class of solvent mixtures listed above, suitable nonpolar solvents within which polymerization occurs include benzene, toluene or hexane. Representative suitable polar solvents include tetrahydrofuran (THF), dimethoxyethane or tetramethylethylenediamine. In the case of THF, the weight ratio of the nonpolar solvent to the polar solvent in accordance with this invention is between about 0.003 and about 0.010, preferably between about 0.005 and about 0.007. When this ratio is too high, the reaction rate becomes excessively high. When the ratio is too low, undesirable excessive cross-linking and syneresis occurs. Also, in the case of THF, in accordance with this invention, it is necessary to regulate the weight ratio of the nonpolar solvent to the polymerization initiator to between about 2 and about 10, preferably between about 3 and about 5. When the ratio of the polar solvent to the polymerization initiator is too low, undesirable cross-linking to form star polymers occurs. When this ratio is too high, the reaction rate becomes excessively high. For the second class of solvent mixtures discussed above, a representative suitable solvent mixture is 75% dioxane/25% toluene (v/v) or 75% dioxane/25% benzene. Representative suitable polymerization initiators include alkyllithium such as n-butyllithium, sec-butyllithium, t-butyllithium, cumylpotassium or sodium naphthalene. Thus, the particular weight ratio of nonpolar solvent to polar solvent utilized depends upon the particular solvent composition employed. In any event, the solvent composition and initiator composition is regulated so that linear polymerization is formed while cross-linking is minimized. It is also possible to eliminate the nonpolar solvent and utilize the polar solvent exclusively. Thus, THF below about −40° C. can be utilized alone. Aternatively, dioxane can be utilized above about 30° C.

In accordance with this invention, divinylbenzene can be polymerized or copolymerized. Normally, divinylbenzene is available only as a mixture thereof with ethylstyrene. Typically, these mixtures comprise about 60 weight percent divinylbenzene and about 40 weight percent ethylstyrene. It is preferred to maximize the weight ratio of divinylbenzene while minimizing the weight ratio of ethylstyrene so that the resultant gel product contains a high concentration of free vinyl groups which are chemically accessible. Alternatively, the divinylbenzene can be copolymerized with any acyclic non-acidic polymerizable monomers such as 1,3 butylene dimethacrylate, dilactone or the like. The divinylbenzene can comprise from about 1 weight percent of the copolymer, preferably at least about 100 weight percent of the copolymer.

Generally, polymerization is conducted in a solution comprising between about 2 and about 40 weight percent monomers. The polymerization initiator is added to the solution to effect polymerization which is conducted within a temperature range of between about −100° C. to 100° C., preferably between about 0° C. and 60° C. Generally, it is during the period of between 5 seconds and about 1 hour that the product obtained is a gel which imbibes the solvent within its interstices. The gel is macroscopic and generally comprises a singular mass formed from the polymerizable monomers. The interstices are sufficiently large as to provide chemical access to the free vinyl groups which are present along the polymer chains which generally comprise at least about 30% of theoretical as measured by chemical titration methods. The interstices are sufficiently large to provide chemical access to the free vinyl groups since the degree of cross-linking between linear chains is less than about $5.4 \times 10^{-4}$ moles of cross-links/cm$^3$ of dry gel. If desired, the solvent can be removed from the gel such as by evaporation to leave a relatively hard polymeric product. This product can be reformed into gel form merely by adding a compatible solvent thereto.

Products of this invention are useful in a wide variety of applications. For example, the gel can be utilized to purify liquids such as a solvent which contains impurities that can coact with the free vinyl groups in the gel. For example, the gel can be utilized to purify a solvent containing unwanted polymerization initiator such as butyllithium by adding the gel to the impure solvents. Reaction with the butyllithium is evidenced by a change of color of the gel and additional gel is added to the solvent until the newly added gel does not change color, which evidences complete removal of the butyllithium.

In an alternative use, the gel can be chemically modified by reacting a material which interacts with the free vinyl groups of the gel. For example, the gel can be converted to a catalyst by reacting organometallic reagent or inorganic salt with the gel under conditions to bind the metal to the gel through the free vinyl group. Representative suitable metals which can be bound to the gel in this fashion include copper, iron, silver, platinum, palladium, rhodium, nickel or chromium. Alternatively, the following materials can be formed from the gel which can be utilized as ion exchange resins or in affinity chromatography. For example, the resins can be sulfonated with $H_2SO_4$ to yield a high surface area ion exchange resin of controlled size and structure.

The following examples illustrate the present invention and are not intended to limit the same.

EXAMPLE I

Divinylbenzene was deinhibited by successive washing with 10% sodium hydroxide followed by distilled water and was stored over molecular sieves at 0° C. The monomer composition was 60 weight percent divinylbenzene and 40 weight percent ethylstyrene. The ratio of meta to para divinylbenzene was 3 to 1. Reagent grade benzene, tetrahydrofuran, 1,4 dioxane and toluene were dried over molecular sieves. Normal and secondary butyllithium were diluted in hexane.

Reactions were performed at room temperature in sealed, flamed and argon-flushed pyrex test tubes. Solvents and monomer were each introduced to the vessel by syringe and mixed. Similar addition of initiator was followed by a color change from colorless to burgundy brown and subsequently gelation. The reacting solution-gel was left for 24 hours and recovered in benzene. Over a period of time, reaction with oxygen terminated the activity of the gel as indicated by loss of color.

Varying the molar ratio of tetrahydrofuran to initiator (normal or secondary butyllithium) between values of the THF/I=0 and 4 in benzene produced a dramatic effect in the product obtained. Initiation in the absence of THF leads to slow development of color with subsequent polymerization and gelation dominated by extensive syneresis; the opaque gel so produced has little mechanical strength and crumbles on handling. Addition of initiator to a solution with THF/I=4 instantaneously produces a burgundy color followed by rapid homogeneous gelation. The product is a clear uniform gel of superior strength. Varying the THF/I between 0 and 4 results in large changes in reaction time and product characteristics. The polyvinyl macrogel synthesized with THF/I=4 was found to provide the most suitable material for application to solvent purification. It can be readily cut into serviceable pieces as received in the swollen state, while also containing a sufficient concentration of vinyl groups. The ratio of THF to benzene varied between 0 and 0.0071. The conditions for synthesis of this gel are summarized in Table 1.

The gel was analyzed for accessible vinyl content in the following manner: 1.5 grams (dry weight) of 0.5 cm$^3$ size particles were suspended in toluene charged with excess n BuLi and allowed to react under purified argon for one week. The presence of available vinyl groups for reaction in the gels was evidenced by the appearance of a deep reddish-brown color. The solution was drained and a 250 ml aliquot of a standardized solution of toluene and benzoic acid was added. The activated gel particles turned colorless. Aliquots (50 ml each) of the remaining solution were titrated for benzoic acid content with a standardized solution of methanol and sodium methoxide. Phenophthalien was added as an end point indicator. The titration technique was verified independently on a known solution of benzoic acid in toluene. This method yielded results which indicated that at least 30% of the theoretical number of vinyl groups that would be present if no cross-linking had occurred were still present in the final product and were available for reaction. A value of 30% corresponds to $1.4 \times 10^{-3}$ moles of available vinyl groups per gram of gel.

The method of characterization was chosen in order to duplicate actual conditions employed during solvent purification as discussed below.

The polyvinyl gel was tested for solvent purification capabilities in a series of anionic polymerizations. Approximately 2.0 grams (dry weight) of gel material was suspended over 1500 ml of pre-distilled solvent under argon. For the case of polymerizations to be later initiated with n butyllithium, a suitable amount of anisole was added to the solvent to provide for a high rate of initiation.

Sufficient n BuLi (1.6M) is added to the solvent and the solution was stirred for several days. Subsequent lowering of clear gel particles into the solvent provided fresh vinyl material for initiator removal as evidenced by the appearance of a reddish-brown color in the gel. When the newly added gel particles remained colorless, the purification of the solvent was assumed to be complete. Gas chromatographic analysis confirmed the purity of the solvent and in particular verified the absence of DVB at a sensitivity of less than 1 part per million.

The purified solvent thus obtained was then utilized to polymerize styrene and butadiene monomers. The styrene and butadiene monomers were purified by various standard distillations and/or by contact with drying agents such as molecular sieves, sodium mirrors and calcium hydroxide. Diluted solutions or pretitrated normal and secondary butyllithium in hexane were employed as initiators; all polymerizations were carried out under purified argon. After introducing the purified solvent to the reactor, leaving the activated purifying gels behind, a metered amount of styrene or butadiene monomer was added and initiated with butyllithium. The amount of monomer varied between 30° to 50° C. Upon completion of the reaction, the polymer was terminated with a small amount of methanol.

The linear polymers obtained from the reactions described above were analyzed by high performance size exclusion chromatography employing a set of Zorbax PMS bimodal columns with THF as the mobile phase. Table 2 compares the experimentally obtained number average molecular weight of each sample to that predicted by the stoichiometry of initiator and monomer charged to the reactor. Deviations of actual to theoretical molecular weights are well within the limitations set by the accuracy of the equipment. Low polydispersity indices were also obtained as expected and are shown in Table 2.

A polymerization under similar conditions with solvent prepared in an identical fashion except for the gel purification step resulted in complete deactivation of added initiator and no polymerization. This clearly illustrates the capability of the polyvinyl gel material in this solvent purification application.

The major advantages of this technique of solvent purification are summarized as follows:

(a) Simple establishment, maintenance and verification of an absolute level of purity in organic solvents to be used in anionic polymerizations.

(b) Avoidance of tedious and energy inefficient separation schemes.

(c) Direct applicability to large scale polymerizations involving sizeable quantities of solvents.

The homogeneous gels containing the free vinyl groups described above remain clear and exude no solvent over a period of many days. Recovery in pure solvent produces no additional swelling. Lowering the concentration of monomer by a factor of 4 (2.5% by volume) has no effect on the clarity of the final product nor on the time dependent stability of the gel. Under these conditions, the reaction goes to completion at a proportionately higher swelling ratio. It appears that cessation of cross linking apparently corresponds to the point of swelling equilibrium. Drying and weighing recovered gels has verified complete conversion of monomer to polymer. Furthermore, upon solvent removal and annealing, isotropic shrinkage accounts for essentially all of the volume previously occupied by solvent. These observations appear to be consistent with the proposed sequence of events leading to homogeneous gelation and anion immobilization.

In order to examine the proposed mechanism set forth above in more detail, a series of gelation reactions in a mixed solvent composed of 75% dioxane and 25% toluene (v/v) were conducted. It has been shown that lithium polystyryl in dioxane exists and propagates via unassociated contact ion pairs. Therefore, by carrying out a gelation in the solvent, the same addition mechanism was maintained as for the case of benzene while eliminating undesirable living end dimerization. The 25% toluene was added to the dioxane in order to obtain a solubility parameter comparable to that of benzene while leaving the dielectric characteristic of the solvent mixture for the most part unchanged from that of pure dioxane.

The results of these experiments are indicated in Table 3 along with the corresponding information for the previous two cases. As expected, the clarity and structural characteristics of the dioxane/toluene and the benzene/THF gels were indistinguishable.

These results indicate that the dominant factor in suppressing syneresis appears to be the avoidance of lithiumpoly (DVB-ES) dimerization. This favorable condition can be achieved in a variety of ways, for example, by the addition of small amounts of THF or 1, 2 dimethoxyethane to solvents such as benzene or by the selection of appropriate overall solvent mixtures such as dioxane/toluene. In the absence of such association, early stage polymerization is predominantly linear chain growth due to the high concentration of monomer units relative to polymer repeat units. Linear polymerization is also enhanced by a degeneracy of 2 between the vinyl content of DVB monomer versus polymer repeat unit along with the inability of ethylstyrene to contribute to cross-linking. Polymer chain diffusional and steric restrictions also appear to favor linear addition. Thus, prior to gelation, the reaction medium is composed of soluble living polymer which then forms a stable macroscopic homogeneous network.

TABLE 1

| Reagent | Concentration (mole/liter) |
| --- | --- |
| DVB (75% meta, 25% para) | 0.83 |
| Ethylstyrene (mixed isomers) | 0.55 |
| Benzene | 9.01 |
| n-BuLi | 0.016 |
| THF | 0.064 |

Experimental conditions for the synthesis of gels used in solvent purification.

TABLE 2

| Monomer | Solvent | $M_{N theoretical}$[a] | $M_{N experimental}$[b] | $M_W/M_N$[b] |
| --- | --- | --- | --- | --- |
| styrene | toluene[c] | 99,000 | 105,000 | 1.19[d] |
| styrene | benzene[e] | 81,000 | 81,000 | 1.06 |
| styrene | benzene[e] | 149,000 | 144,000 | 1.06 |
| butadiene | benzene[e] | 90,000 | 94,000[f] | 1.05[f] |

Comparison of theoretical and actual molecular weights obtained for polymerization of listed monomers in solvent purified using polyvinyl gels.
[a]Determined by stoichiometry of monomer and initiator charged to the reactor
[b]Determined by HPSEC calibrated with 10 polystyrene standards
[c]Initiated with sec butyllithium
[d]This relatively high value is expected due to chain transfer reaction (14)
[e]Initiated with n butyllithium in the presence of anisole
[f]Calculated using universal calibration

TABLE 3

| Solvent | Benzene | Benzene/THF (0.994/0.006) | Dioxane/Toluene (0.750/0.250) |
|---|---|---|---|
| time to full color (sec) | >120 | instantaneous | instantaneous |
| time to gel (sec)[a] | ~1200 | ~20 | ~160 |
| expected overall rate constant (liter mole$^{-1}$ sec$^{-1}$)[b] | 0.01 | 25.3[c] | 0.9 |
| clarity of gel structural characteristics of gel | opaque inhomogeneous (powder) | clear homogeneous (swollen rubber) | clear homogeneous (swollen rubber) |

Variations observed in gelation reactions and products. Experimental conditions are as in Table 1 keeping the relative volume of solvent constant.
[a]Subject to small deviations due to an inability to accurately control reaction temperature.
[b]Based on values for lithium polystyryl.
[c]Assuming propagation is via monoetherate of lithium poly (DVB-ES).

We claim:

1. The process for forming the composition comprising a macroscopic gel network which is insoluble in a solvent, containing at least about $1.4 \times 10^{-3}$ moles chemically accessible free vinyl groups per gram of gel, comprising a polymeric composition obtained by polymerizing a monomer composition selected from the group consisting of divinylbenzene monomer and divinylbenzene copolymerized with an acyclic nonacidic polymerizable monomer which comprises contacting said monomer composition with an anionic polymerization initiator in the presence of a solvent comprising a polar solvent composition, said solvent composition being selected from the group consisting of (a) a nonpolar solvent and a polar solvent comprising tetrahydrofuran, dimethoxyethane or tetramethylethylenediamine, (b) a mixture of dioxane and toluene, (c) a mixture of dioxane and benzene, (d) tetrahydrofuran at a temperature below about $-40°$ C. and (e) dioxane at a temperature above about $30°$ C., the weight ratio of the soluble composition and the polymerization initiator being regulated to favor linear polymerization while minimizing cross linking and syneresis.

2. The process of claim 1 wherein said monomeric composition is divinylbenzene.

3. The process of claim 1 wherein said monomeric composition is a mixture of divinylbenzene and ethylstyrene.

4. The process of any one of claims 1, 2 or 3 wherein said solvent comprises a mixture of benzene and tetrahydrofuran.

5. The process of any one of claims 1, 2 or 3 wherein said solvent comprises a mixture of toluene and dioxane.

6. The process of any one of claims 1, 2 or 3 wherein said initiator is a butyllithium.

* * * * *